United States Patent [19]

Voigt et al.

[11] 4,366,107

[45] Dec. 28, 1982

[54] MAKING SHRINK-FIT OBJECTS

[75] Inventors: Hermann U. Voigt, Langenhagen; Frank Patzke, Lehrte, both of Fed. Rep. of Germany

[73] Assignee: Kabel- u. Metallwerke Gutehoffnungshütte AG, Hanover, Fed. Rep. of Germany

[21] Appl. No.: 193,486

[22] Filed: Oct. 3, 1980

[30] Foreign Application Priority Data

Oct. 8, 1979 [DE] Fed. Rep. of Germany ....... 2940719

[51] Int. Cl.$^3$ .............................................. H05B 6/64
[52] U.S. Cl. ................................... 264/25; 264/209.6; 264/230
[58] Field of Search ....................... 264/25, 209.6, 230

[56] References Cited

U.S. PATENT DOCUMENTS

| 3,949,110 | 4/1976 | Nakajima et al. | 264/230 |
| 4,049,757 | 9/1977 | Kammel et al. | 264/25 |
| 4,117,063 | 9/1978 | Voight et al. | 264/174 |
| 4,117,195 | 9/1978 | Swarbrick et al. | 264/174 |

FOREIGN PATENT DOCUMENTS 188510 1/1957 Austria .

Primary Examiner—Donald E. Czaja
Assistant Examiner—W. Thompson
Attorney, Agent, or Firm—Ralf H. Siegemund

[57] ABSTRACT

Silane is grafted upon polymer molecules and the material is shaped (e.g., extruded or injection-molded) and caused to cross-link. Both steps must be completed before expanding (following reheating, if necessary) and cooling the object at the expanded state. Cap- and sleeve-making is disclosed, including internal as well as external exposure to water for cross-linking, possibly combined with the requisite preheating for the expansion.

19 Claims, 4 Drawing Figures

MAKING SHRINK-FIT OBJECTS

BACKGROUND OF THE INVENTION

The present invention relates to the making of shrink objects such as shrink hoses, shrink sleeves, shrink caps, or the like.

Austrian Pat. No. 188,510, dated Jan. 25, 1957, discloses a method for making shrink hoses by extruding or injection-molding a hose from a thermoplastic material, but having a smaller diameter than the hose to be made. The extruded hose is then expanded by means of air pressure and cooled to fix its expanded dimension. The hose is later shrunk through application of heat and will contract to a reduced diameter for a shrink fit. The particular thermoplastic hose, e.g. a polyvinylchloride hose, does not achieve a sufficient stabile temperature and does not have an adequately elastic memory, in that it will not shrink exactly to its original dimensions established upon extrusion.

A particular product is known and traded under the designation "THERMOFIT" which is a high-density polyolefin to be used for injection-molding particular shapes. These parts are subsequently subjected to high-energy electron rays in order to obtain a cross-linked, three-dimensional lattice assembly of the molecules. Such a shape is quite strong mechanically, is creep-resisting, does not tear, and has an elastic memory. Upon making a hose or sleeve in that fashion and slipping it upon the object to be covered, shrinkage is obtained by briefly heating the sleeve above the crystallization point, at about 135° Celsius. The sleeve will, thereupon, return rapidly to its original shape and dimension, and a truly strong cover is obtained.

The method as described in the preceding paragraph is applicable to other base polymers, also to modified polymers, depending upon any special requirements during its use. The critical aspect of this method, however, is the cross-linking by means of electronic beams, prior to heating and expansion. Such a method is, therefore, quite expensive for reasons of the requisite equipment, and also for reasons of providing adequate protection for persons involved.

DESCRIPTION OF THE INVENTION

It is an object of the present invention to provide a new and improved method for making shrink objects having an elastic memory and having features at least as good and versatile as articles made with cross-linking by means of radiation.

In accordance with the preferred embodiment of the present invention, it is suggested to provide a graft polymer whereby the grafted-on molecules are of the type which will cross-link in the presence of moisture. Such graft molecules are preferably an organo-silane. This grafted-on material is shaped into an object having the shape that the final product will ultimately have, after heat-shrinking has been provided for in situ at a later time. Presently, moisture cross-linking is now to occur, or to be iniated, prior to or during shaping and is to be completed prior to expansion as the object is maintained at a shape similar to the ultimate heat-shrunk shape. Following completion of cross-linking, the object is expanded at an elevated temperature which, in turn, is followed by cooling so that the object maintains its expanded configuration until heat is again applied, causing the object to shrink back to the shape in which it cross-linked. The cross-linking may commence already as the material is being given its shape (extruder heat, mold); cross-linking may even be completed in the mold or completed merely by exposure to the atmosphere, possibly being enriched in moisture (steam). Alternatively, the shape may be cross-linked at least to a significant extent after shaping, but as the shape is being maintained, under utilization of a suitable device (tank) exposing the shape to water.

The invention is based on the discovery that pursuant to the grafting of low-molecular compounds (e.g., organo-silane) onto the macromolecules of a polymer, secondary reactions thereof produce polyfunctional chain-linking resulting in "bundled" cross-linking points or nodes, whereby a single cross-linking node fixes (links) several macromolecules simultaneously via the silane. This particular chemical cross-linking mechanism leads to large bonding forces of the molecules. Upon heating, or at an elevated temperature, there is some loosening of the bond which permits an expansion and "freezing" in the expanded configuration on cooling; but upon reheating, the original shape is restored exactly by shrinking. Thus, the moisture cross-linking of the material of the shaped object results directly in the generation of an elastic memory condition and configuration for the article, which memory is retained after expansion. The preferred application of the invention is the making of hoses, sleeves, and caps, to be used as gas-tight and moisture-proof covers for cable ends, cable or tube splices, or other connections and joints for cables, tubes, etc. The objects thus made have similar properties to those made by means of cross-linking through radiation; but the manufacturing process is greatly facilitated. It should also be mentioned that peroxide cross-linking leads definitely to inferior articles.

In one preferred form of practicing the invention, cross-linking is carried out at an elevated temperature of above 80° C., but not higher than about 200° C., preferably in a range of 140° C. to 180° C., if that particular, thermally enhanced cross-linking is carried out or continued after the shaping proper has been completed. The expansion may now be carried out when the object is still hot, i.e. on line; and thereafter, the object will cool and "freeze" in the expanded configuration. The cross-linking may already commence and proceed during the initial molding or extruding process in which the product is given its shape. In this case, positive exposure to moisture of the product, subsequent to shaping proper, can be dispensed with. This is particularly the case when the material contains additives which will release water upon heating, such as aluminum oxide hydrate.

Whenever cross-linking is not possible, or only insufficiently possible while the shape resides in the shaping tool (die, mold, and so forth), the shape may be passed through a steam atmosphere, analogous to a sauna, at a rather high temperature. Alternatively, one may use a hot glycerin water bath or a hot oil water bath or water mixed with polyalcohol, such as ethylene glycol and homologes thereof. Aside from a rather uniform temperature, this has the following advantage. The bath's components, which are better compatable with the polymer than water, speed the diffusion of the water into the grafted polymer in order to obtain the cross-linking.

The base material can be any polymer permitting radically initiated grafting, particularly of organo silane. For reasons of working, polyethylene or an ethylene copolymer with vinylacetate or acrylate comonomer are preferred. One may also use ethylene propylene rubber, possibly blended with polypropylene.

The organo silane is preferably vinyltrimethoxy silane under utilization of a relatively small amount of a catalyst, preferably dibutyl-tin-dilaurate. The amount of organo silane needed can be taken by analogy to peroxidic cross-linking. The molar ratio of peroxide-generating, radical sites at the macromolecules to silane is preferably about 1:10. This way, one ensures that the requisite molecular bonding forces are, indeed, available for causing the expanded object to shrink back to its "memorized" configuration.

In addition, one may use use certain fillers which should be nonhygroscopic, if possible even hydrophobic, so that the moisture cross-linking is not interfered with; any $H_2O$ molecules should be available for the cross-linking and not be absorbed or trapped, otherwise. A particular filler of interest is carbon black (soot) for reasons of enhancing resistance against ultraviolet radiation. So-called acetylene black is very suitable here for reasons of its nonhygroscopic properties. This particular type of carbon black has a high conductivity and relatively low quantities; e.g., 15 to 30 parts (by weight) per 100 parts polymer suffices to provide the object with an antistatic characteristic or even outright conductivity at satisfactory mechanical and rheological features. Also, if microwave reheating is used for preparing for the expansion, a carbon black filler is an excellent absorber for microwaves so that the reheating will be very efficient (low power consumption). About 5 to 40 parts, preferably 8 to 20 parts, by weight per 100 parts polymer are envisioned here for the shrink article.

In addition to carbon black or in lieu thereof, one may use other nonhygroscopic fillers, such as chalk, kaolin, or talcum. The range of usages for such fillers is generally from 5 to 30 parts, preferably 10 to 20 parts, by weight per 100 parts polymer. Aside from lowering the price, hardness, heat resistance, and pressure resistance can be improved by these additives.

As mentioned above, one may use still other additives, namely those of the type which release a definite amount of water at higher temperatures. This makes sure that cross-linking begins already in the die or mold, i.e. right in the shaping tool, possibly even during shaping of the mold or in an extruder head. Suitable additives for this purpose are, for example, partially hydrophobilized silicic acid or silicates or aluminum oxide hydrate. The latter decomposes at a temperature of above 180° C. as per the relation $$2Al(OH)_3 \rightarrow Al_2O_3 + 3H_2O.$$

A particularly useful product for purposes of the invention is an aluminum oxide hydrate traded by the company Martinswerk under the designation "Martinal A-S." The silanized version is traded under the designation "Martinal A-S/101." These fillers have on the average a grain size of about $0.4\mu$, and particularly the silanized additive is very compatible with polyethylene.

DESCRIPTION OF THE DRAWINGS

While the specification concludes with claims, particularly pointing out and distinctly claiming the subject matter which is regarded as the invention, it is believed that the invention, the objects and features of the invention, and further objects, features, and advantages thereof, will be better understood from the following description taken in connection with the accompanying drawings, in which:

Proceeding now to the detailed description of the drawings, FIG. 1 illustrates an extruder 2 having an inlet hopper to be charged with a granulated blend of the following composition (all parts by weight):

Figure 1:
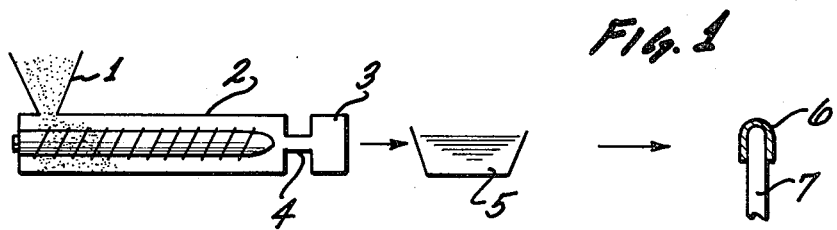
FIG. 1 is a schematic view of an equipment for practicing the preferred embodiment in accordance with the best mode thereof for making caps.

| | |
|---|---|
| 100 parts | polyethylene homopolymer (0.94 g/cm$^3$ density, 0.2–2.5 melt index) |
| 1.0–1.5 parts | vinyltrimethoxysilane |
| 0.03–0.05 parts | dicumylperoxide |
| 0.05 parts | of a graft catalyst, e.g. NAFTOVIN SN/L (dibutyl-tin-dilaurate) |
| 15 parts | carbon black (acetylene black Y) |

Actually, one may charge the extruder with the individual components and rely on the blending capabilities of the barrel-and-screw combination. It is, however, advisable to premix and homogenize the PE and the filler (e.g., soot, or chalk). In any event, the material (PE) will melt in the extruder 2 and will be homogenized therein. Since a graft catalyst and a radical site initiator have been added, the silane will be grafted on the polymer when a temperature of above 140° C. has been reached. The temperature should rise to, preferably, 160° C. to 200° C.

The extruder nozzle 4 feeds a die or mold 3 for making caps. Thus, the molding process is actually analogous to injection-molding using an extruder for the preparation of the raw material, a homogenized blend of silane-grafted PE. Some cross-linking will occur already in the mold because there is some residual water in the blend. However, the product will be cooled for taking it out of the mold but not down to room temperature.

The caps as made are still quite hot (80° C.), and it is advisable to use that thermal content for obtaining an accelerated corss-linking in a moist atmosphere or environment. As schematically indicated, a tank 5 filled with an oil water emulsion or a water glycerin blend is provided to receive the caps made. This bath keeps the temperature constant (by suitable heating) and accelerates the cross-linking process further by direct exposure of the objects to water. The temperature is above 80° C., preferably between 140° C. and 180° C., and possibly as high as 200° C. The caps as made remain in that bath for a certain period of time such as 3–30 min., and, while still warm, are taken out and expanded. Reference numeral 7 denotes a mandrel, or the like, upon which a cap, such as 6, is slipped. It is important that the caps be expanded while the cross-linked material is heated to a temperature above the crystallization point of melting. The heat content of the product, acquired during the cross-linking, should be used as much as possible during the expansion. Thus, expansion should follow immediately upon completion of cross-linking in the bath and removal of the caps from the bath. The mandrel may additionally be provided with apertures to blow air into the cap and expand it. The cap is permitted to cool in this expanded state, to "freeze" this configuration even after expansion pressure is relieved.

Providing cross-linking by means of a water bath is practical, particularly in the case of continuous production; but it is not essential in principle, exposure to steam may suffice. In other instances, the moisture content of the polymer or of any additive may suffice to obtain cross-linking already in the mold 3. Subsequent exposure to moisture may be needed merely to complete cross-linking.

The otherwise completed object (cap, and so forth) may subsequently be coated on the inside with a melt adhesive on the base of polyamid or polyester, to enhance bonding when the object is subsequently heat-shrunk.

Figure 2:
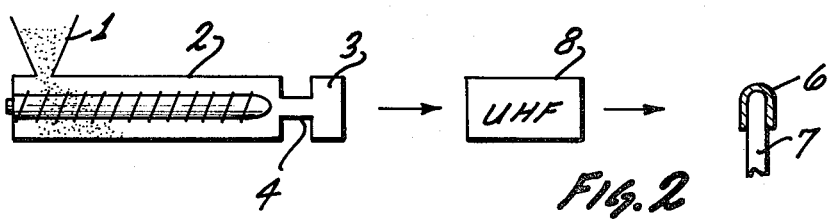
FIG. 2 is a similar view of a modified equipment.

The example shown in FIG. 2 includes similar molding equipment; also, the expansion process for a cap is the same, at least in principle. It is, however, assumed that no extensive exposure of the cap to water is needed. Rather, the blend used here for making a cap may include water-releasing substances, e.g. $Al_2(OH)_3$ (see the last example below). Partially hydrophobized silicate can also be used. In either case, the very hot material in the mold will release the requisite water throughout the material, and cross-linking occurs speedily, right in the mold, without requiring diffusion of water from the outside.

The completed product, having been permitted to cool in the mold, will next be heated in a microwave unit 8. If carbon black is included in the material, ready absorption thereof and speedy heating is ensured.

It should be mentioned that in other cases, whenever a mere exposure to moisture suffices for cross-linking or completion of cross-linking, a microwave heater may be used to enhance that cross-linking and to prepare the object for subsequent expansion.

Figure 3:
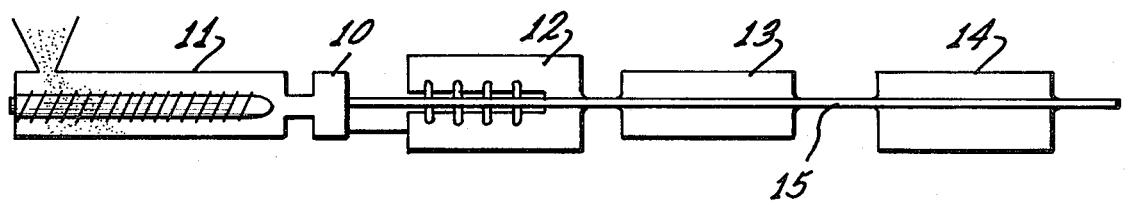
FIG. 3 is a schematic view of an equipment for making shrink hoses in accordance with the preferred embodiment and best mode of practicing the invention.

FIG. 3 illustrates an extruder 11 having an extrusion head 10 for making a hose 15 on a continuous basis. The material to be used is preferably the same or similar to the composition outlined above. This hose is fed into a vacuum calibrator 12, preventing it from collapsing having sizing rings for providing it with the dimensions which the final product is to have after shrink fit; in other words, the equipment 12 provides the hose with the dimensions it is to memorize. The internal pressure inside the hose serves also as an inflating support. The hose is next fed through a glycerin water bath 13 maintained at a temperature of from 130° C. to 180° C., preferably from 160° C. to 180° C. Since the hose is a continuous object, internal pressure continues to act upon the hose wall, for serving as a support and for preventing the hot hose from collapsing in the bath.

The hose passes next through a cooling tank 14, and the cooled hose may then be cut into the desired lengths. The cooling step is is needed here to make sure that the shape remains stable. The hoses, sleeves, hollow fittings, and so forth, as subsequently cut do have, at this point, a diameter which is to be memorized and will be memorized by operation of the cross-linking which is now completed. Next, the hoses, sleeves, and so forth, will be expanded, e.g., by slipping them over mandrels. Preheating will be necessary, e.g., by operation of microwave heating, as described earlier. A highly suitable method of expanding an uncut hose is disclosed by one of us and others in a companion application of common Assignee's Ser. No. 201,184, filed on Oct. 27, 1980.

Figure 4:
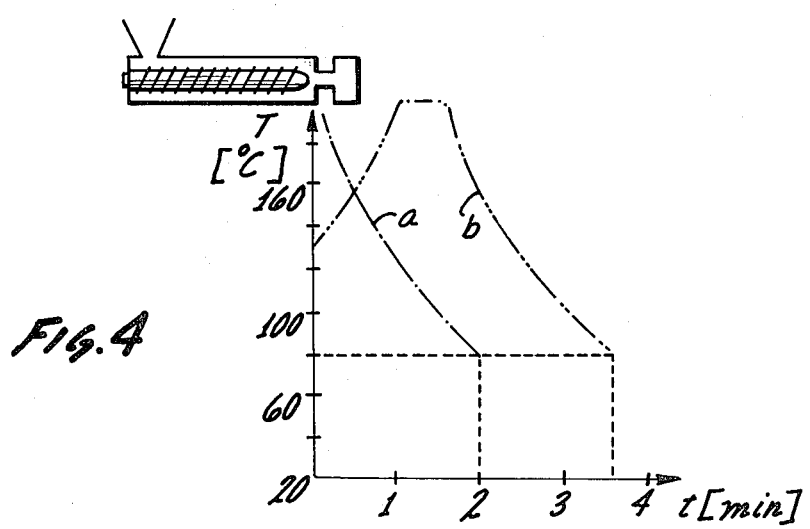
FIG. 4 is a diagram showing temperature versus time for different materials.

FIG. 4 compares a known process with the present process, particularly in regard to peroxide cross-linking. The silane-to-peroxide ratio (molar values) is to be at least 10:1. Trace "a" depicts moisture cross-linking; trace "b" depicts peroxide cross-linking; both are plotted against time, with time "O" being the instant that the material leaves the extruder or is injected into a mold, as schematically indicated.

As far as moisture cross-linking is concerned, the PE blend to be grafted and being grafted is heated in the extruder by means of heat conduction through the wall of the extruder barrel, being heated. Also, the worm creates significant amount of friction, including shear forces in the blend which are dissipated internally as heat. As the temperature rises, grafting occurs. Cooling of the material begins on the transition from the extruder to the mold. This is, in fact, the meaning of curve "a." The object resides for two minutes in the mold during cooling, whereupon it is removed. Silane moisture cross-linking has begun in the mold and may have to be completed as outlined above.

In the case of peroxidic cross-linking, the temperature must not exceed 130° C. as cross-linking is not to being prior to charging of the mold. No such limit exists for moisture cross-linking. Hence, the particular material must be heated in the mold in order to obtain the cross-linking temperature of 200° C., reside in the mold for one minute or so at that temperature, followed by cooling, when still in the mold. Total residence time is, thus, considerably longer than in the case of moisture cross-linking. Moreover, the energy consumption is higher in a peroxidic cross-linking method because one must cool the material so that it will not exceed 130° C. prior to entry into the mold. That active cooling of the peroxidic cross-linking material consumes more energy than heating of a moisture cross-linking material in the extruder barrel, up to 200° C., particularly under utilization of all of the available heat-dissipating processes (friction).

In the following, additional examples are given for materials to be used for different kinds of shrink objects, in particular for caps; all parts are by weight.

| | |
|---|---|
| Polyethylene copolymer (2 to 7 Mol % vinylacetate) | 100 parts |
| Calcinated China clay (hard kaolin M 100) | 10 parts |
| Carbon black | 10 parts |
| Vinyltrimethoxy silane | 2 parts |
| Peroxide | 0.05–0.1 parts |
| Dibutyl-tin-dilaurate catalyst (NAFTOVIN SN/L) | 0.05 parts |

In another example, the clay and the particular amount of carbon black are replaced by 15 parts of nonhygroscopic chalk (e.g., millicarb/omya) and 5 parts carbon black.

In yet another example (see particularly FIG. 2 for its usage), a filler is used which will decompose and release water, already prior to and during the shaping process.

| | |
|---|---|
| Polyethylene homopolymer (density 0.94 g/cm$^3$, melt index 0.2 to 2.5) | 100 parts |
| Aluminum oxide hydrate (e.g., Martinal A-S/101) | 2–10 parts |
| Carbon Black | 10 parts |

| | |
|---|---|
| -continued | |
| Vinyltrimethoxy silane | 1.8–2.0 parts |
| Peroxide | 0.05–0.1 parts |
| Catalyst (dibutyl-tin-dilaurate) | 0.05 parts |

The aluminum oxide hydrate can be replaced by partially hydrophobized silicic acid. In either case, this particular blend releases water in the mold, and even earlier than that. Thus, this particular composition is highly suitable for making caps because cross-linking is at least partially completed prior to taking the article out of the mold.

The invention is not limited to the embodiments described above; but all changes and modifications thereof, not constituting departures from the spirit and scope of the invention, are intended to be included.

We claim:

1. The method of making a shrink object, comprising the steps of
   providing a polymer blend with a graft component;
   causing the graft component to be grafted upon the polymer, the graft component being of the type for cross-linking the polymer molecules in the presence of moisture;
   exposing said grafted-on polymer to moisture for obtaining the cross-linking;
   shaping the grafted-on polymer into a particular object;
   expanding the completely shaped and completely cross-linked object at an elevated temperature; and
   maintaining the expanded state as the object cools.

2. A method as in claim 1, said exposing step being carried out at a temperature in the range of from 80° C. to 200° C., the expanding step being initiated while the article is still warm.

3. A method as in claim 1, wherein the exposure step includes the internal decompositioning of a water-releasing additive in the blend.

4. A method as in claim 1, including reheating the object prior to expanding, subsequent to shaping.

5. A method as in claim 4, using microwaves for reheating.

6. A method as in claim 4 or 5, reheating the object to a temperature between 120° C. to 170° C.

7. A method as in claim 1, using as polymer one of the following: polyethylene, or a copolymer of ethylene, or ethylene propylene rubber, or a blend of ethylene propylene rubber and a polyolefine.

8. A method as in claim 4 or 7, reheating the object to a temperature between 130° C. and 150° C.

9. A method as in claim 1 or 5, including the step of using from 5 to 40 parts by weight of non-hygroscopic carbon black per 100 parts by weight of polymer as additive.

10. A method as in claim 1, including the step of using from 5 to 30 parts by weight of anorganic filler material such as chalk, kaolin, or talcum per 100 parts of polymer.

11. A method as in claim 1, including the step of heating the blend for shaping as well as maintaining an elevated temperature for cross-linking.

12. A method as in claim 1, wherein the exposure step includes placing the object into or running the object through a bath having a temperature in excess of 80° C.

13. The method comprising the steps of
    providing a polymer blend with a graft component, the graft component being of the type for cross-linking the polymer molecules when grafted thereon, and in the presence of moisture;
    causing the graft component to be grafted upon the polymer;
    shaping the grafted-on polymer to a particular shape;
    at least one of the causing and shaping steps including an extrusion of the grafted-on polymer;
    exposing said shape to moisture for obtaining the cross-linking;
    expanding said shape, after having completed cross-linking and at an elevated temperature; and maintaining the expanded state as the objects cools.

14. A method as in claim 1, 2, 7 or 13, including the step of using a bath of water mixed with glycerin, or polyalcohol, or oil.

15. A method as in claim 14, wherein the bath's temperature is between 140° C. and 180° C.

16. A method as in claim 1 or 13, wherein a silane is used as a graft component, the blend including also a peroxide for obtaining radical sites for grafting, the mol ratio of the silane to peroxide being about 10:1.

17. A method as in claim 1, the shaping including an extrusion step prior to said exposing step.

18. The method as in claim 13 or 17, wherein the shaping is carried out by extruding the polymer into a mold to obtain caps.

19. The method as in claim 13 or 17, wherein the shaping is carried out by extruding polymer to obtain a hose as the shape.

* * * * *